(12) United States Patent
Du

(10) Patent No.: US 6,198,909 B1
(45) Date of Patent: Mar. 6, 2001

(54) COMMUNICATION ENVIRONMENT WITH PLURALITY OF RADIO SYSTEMS

(75) Inventor: Yonggang Du, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/134,108

(22) Filed: Aug. 14, 1998

(30) Foreign Application Priority Data

Aug. 16, 1997 (DE) .............................................. 197 35 527

(51) Int. Cl.[7] ................................ H04Q 7/20; H04Q 7/34
(52) U.S. Cl. ........................ 455/67.1; 455/63; 455/67.3; 455/67.6; 455/423; 455/454; 455/446; 455/448; 455/449; 370/445; 370/446; 370/447; 370/448
(58) Field of Search ................................. 455/67.1, 67.3, 455/63, 67.4, 67.6, 454, 446, 447, 448, 449, 423, 403, 422; 370/445, 446, 447, 448

(56) References Cited

U.S. PATENT DOCUMENTS 5,042,083 * 8/1991 Ichikawa .............................. 455/67.3
5,822,682 * 10/1998 Schroderus et al. ..................... 455/63

FOREIGN PATENT DOCUMENTS

WO9527338 12/1995 (WO) .............................. H04B/1/00

OTHER PUBLICATIONS

By R.O. Lamaire et al. On the Advantages and Disadvantages of Some Options for Sharing Etiquettes in the 5.15.35 GHZ Band, GHZ Sharing Rules Drafting Committee, SRDC/10.28.9613B, Nov. 14, 1996, pp. 1–11.

* cited by examiner

Primary Examiner—Lee Nguyen
Assistant Examiner—Keith Ferguson

(57) ABSTRACT

In a communication environment with a number of radio systems a radio station in one of the radio systems seizes a sub-frequency range in a predetermined frequency range. Prior to each transmission of a useful signal, the one radio station checks whether a given sub-frequency range in the predetermined frequency range is free for a selected size of a propagation area. If the given sub-frequency range is free, the radio station transmits at random instants at least two pulses with a transmission range that is substantially restricted to the given sub-frequency range and avoids collisions with another radio system belonging to the communication environment by detecting whether the other radio system has seized the sub-frequency range in an overlapping radio propagation area at the same time. If the given sub-frequency range is free for the selected size of the radio propagation area and no collision with the other radio system is detected, the radio station transmits useful signals restricted to the given sub-frequency range.

11 Claims, 3 Drawing Sheets

COMMUNICATION ENVIRONMENT WITH PLURALITY OF RADIO SYSTEMS

BACKGROUND OF THE INVENTION

1. Field of the Invention

The invention relates to a communication environment with a plurality of radio systems which have at least one radio station. Before a useful signal is transmitted, the radio station checks whether a certain sub-frequency range in a predefined frequency range is free.

2. Description of the Related Art

From the document "R. O. LaMaire and A. Krishna: On the Advantages and Disadvantages of Some Options for Sharing Etiquettes in the 5.15–5.35 GHz band, 5 GHz Sharing Rules Drafting Committee, SRDC/10.28.96.13B, Nov. 14, 1996" is known a radio system which works in the 5 GHz band according to the LBT method (LBT=Listen Before Talk). Radio stations implementing, for example, a CDMA or TDMA method may occupy a part of a predefined spectrum or of a frequency range. First of all it is then necessary for a radio station to check whether a sub-frequency range is free. This is determined by means of an energy detection in the desired sub-frequency range. If the radio station detects that the certain sub-frequency range is free and thus no other radio station utilizes the certain sub-frequency range for signal transmission, this sub-frequency range is; seized for transmitting useful signals. However, it may happen that two radio stations simultaneously seize the certain sub-frequency range. In that case a proper useful signal transmission cannot take place due to the simultaneous seizure of the sub-frequency range by, for example, two radio stations.

SUMMARY OF THE INVENTION

It is an object of the invention to provide another communication environment with a plurality of radio systems.

The object is achieved in a communication environment with a plurality of radio systems of the type defined in the opening paragraph by the following measures: at least one radio station of a radio system:

in a first phase prior to each transmission of a useful signal, checks whether a certain sub-frequency range in a predefined frequency range for a selected size of a radio propagation area is free, in a second phase if the certain sub-frequency range for the selected size of the radio propagation area is free, transmits at least two pulses restricted to the certain sub-frequency range at random instants and avoids collisions if another radio system has seized the certain sub-frequency range in an overlapping radio propagation area at the same time, and in a third phase, if the certain sub-frequency range for the selected size of the radio propagation area is free and no collision can be detected, transmits at least useful signals restricted to the certain sub-frequency range.

In a communication environment with a plurality of radio systems, these radio systems are to share a predefined frequency range for the transmission of useful signals. Such a radio system may be a base radio station with a plurality of mobile stations or, for example, fixed stations of a directional radio system. Before it transmits useful signals, a radio system is first to check for a defmied selected size of its radio propagation area whether the selected sub-frequency range lying inside the predefined frequency range is occupied. After a radio station has detected in a first phase that a sub-frequency range is free, a second phase is proceeded to in which pulses are transmitted by the radio station at random instants. The bandwidth of the pulses is limited and the pulses have an average energy for a defined period of time on the periphery of the radio propagation area by which energy the other radio systems are not subjected to interference when they do not have overlapping radio propagation areas. When the pulses are transmitted, the radio station shows other radio stations that it would like to occupy the sub-frequency range to which the pulse s are limited. If the radio station detects that another radio station having an overlapping radio propagation area also transmits pulses generated in the same manner in this specific subfrequency range, the second phase will be terminated because a collision will be at hand and will be avoided by going back to the first phase. If the radio station detects that the certain sub-frequency range is free, a change is made to the third phase in which the useful signals are transmitted. Thanks to the measures according to the invention collisions may be avoided even when two or more systems have simultaneous access to a sub-frequency range when their radio propagation areas are overlapping.

The size of the radio propagation area of the radio system is at least determined by the radiated energy of one radio station of the radio system. This radio station detects a sub-frequency range as free when, on the one hand, the radiated energy outside its radio propagation area is so weak that another radio system does not cause interference on this radio station and, on the other hand, the radiated energy of another radio system in the radio propagation area does not cause interference in its own radio system.

After the radio station has detected in the first phase that the certain sub-frequency. frequency range in the predefined frequency range for the selected size of a radio propagation area is occupied, the radio station again checks after a period of time determined at random either with a reduced size of the radio propagation area of the radio system or with another subfrequency range.

If during a predefined period of time the average radiated energy of the radio station is smaller than the energy by which the size of the radio propagation area is determined, the radio station transmits pulses in addition to the useful signals in the third phase.

For each radio system to be in a position to carry out a detection process in like manner, at least one radio station of each radio system stores at least in the second phase the average energy for a predefined time period on the periphery of a radio propagation area, of the predefined time period and of the minimum or maximum instant between two successive pulses.

The radio station determining the size of a radio propagation area determines via an estimated or empirically determined formula the average energy to be radiated during a predefined period of time so that the threshold value known to each radio system is found on the periphery of the radio propagation area. In similar manner, the interference energy is detected of a radio station of at least one other radio system.

A radio system may comprise, for example, a base radio station and a plurality of mobile stations. A mobile station can only communicate with other mobile stations or the base radio station of the same radio system when the mobile station is located in the radio propagation area. For this purpose, each radio station (for example, mobile station) of a radio system performs an energy detection. A radio station is provided for communicating with other radio stations of the radio system only when the energy detection proves that the radio station is located in the radio propagation area of the radio system.

The invention also relates to a radio station of a radio system and a method of seizing a sub-frequency range in a predefined frequency range by a radio system belonging to a communication environment.

BRIEF DESCRIPTION OF THE DRAWING

Examples of embodiment of the invention will be further explained with reference to the Figures, in which.

DETAILED DESCRIPTION OF THE INVENTION

Figure 1:
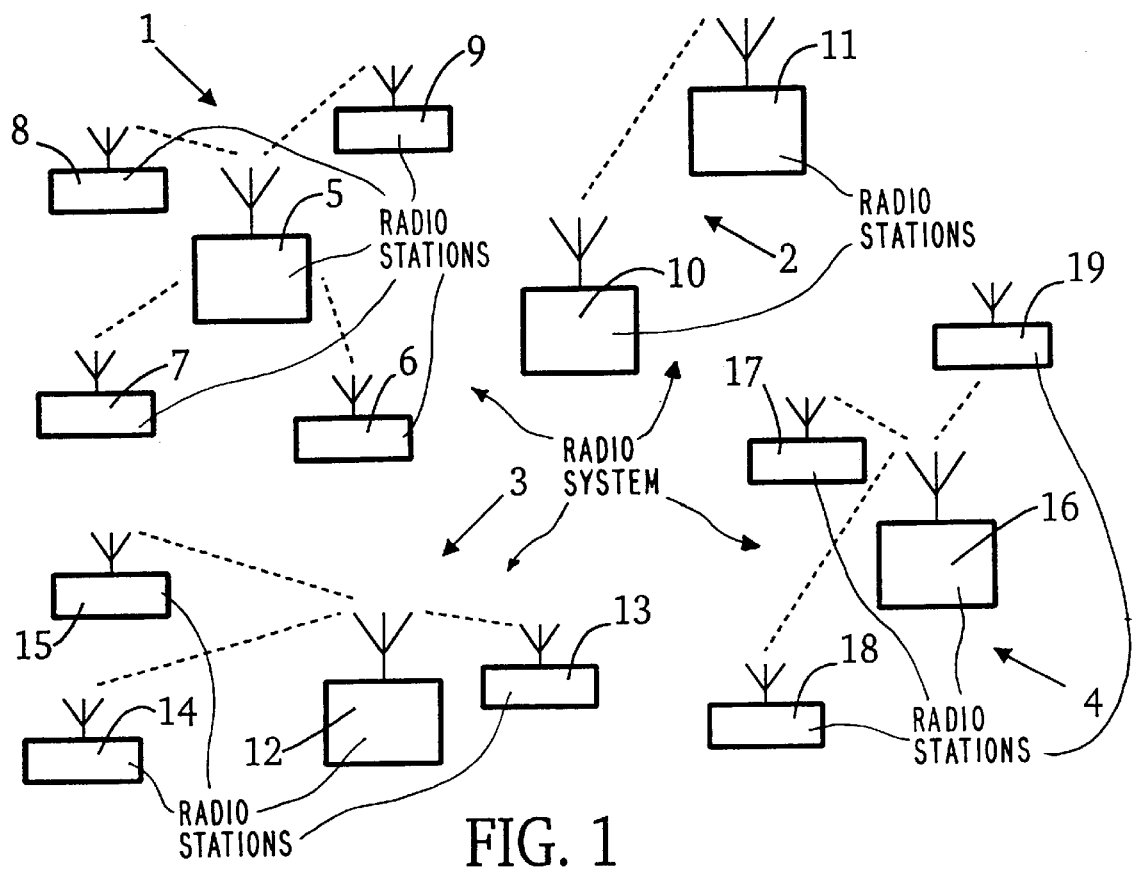
FIG. 1 shows a communication enviromnent with a plurality of radio systems.

FIG. 1 shows a communication environment with a plurality of radio systems 1 to 4. The radio system 1 comprises, for example, five radio stations 5 to 9, the radio system 2 two radio stations 10 and 11, the radio system 3 four radio stations 12 to 15 and the radio system 4 four radio stations 16 to 19. The radio stations 5, 10, 11, 12 and 16, are base radio stations and the radio stations 6 to 9, 13 to 15 and 17 to 19 are mobile stations. In a radio system radio signals are transmitted according to the FDMA, TDMA or CDMA method (FDMA=Frequency-Division Multiple Access, TDMA = Time-Divisior Multiple Access, CDMA=Code-Division Multiple Access). A radio system may also form a wireless local area network which functions according to a TDMA method and transmits ATM cells (ATM= Asynchronous Transfer Mode). Furthermore, there is a possibility of a directional radio link being established with two or more radio stations. A directional radio link (point-to-point connection) could be formed, for example, by the base radio stations 10 and 11 of the radio system 2.

For realizing a largely interference-free transmission of signals in a communication environment with a plurality of radio systems, the radio signals of the various radio systems must not affect each other. This may be realized in that the radio propagation areas of the radio systems do not overlap or in that the radio systems occupy different sub-frequency ranges if the radio propagation areas do overlap. A non-overlapping of the radio propagation areas means that, on the one hand, the radio propagation outside a first radio propagation area of a first radio system is so weak that interference of a second radio system does not occur and, on the other hand, in the radio propagation area of the first radio system, interference caused by signals of the second radio system does not occur.

Figure 2:
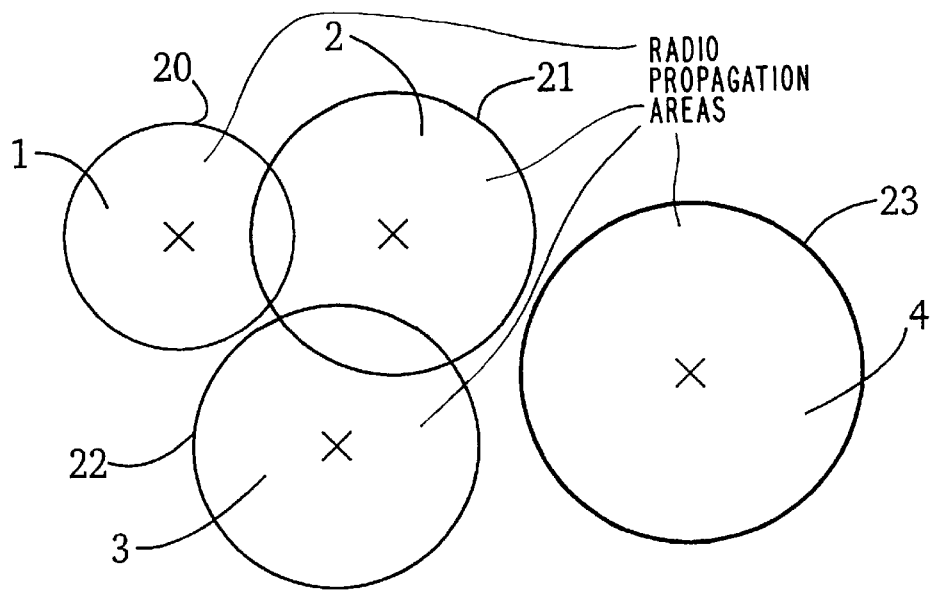
FIG. 2 gives a diagrammatic representation of radio propagation areas of the radio systems shown in FIG. 1.

For simplicity it is assumed that a radio system has. a circular radio propagation area. FIG. 2 shows four circles which represent the radio propagation areas 20 to 23 of the four radio systems 1 to 4 of FIG. 1. On the periphery of such a circle can be measured an average energy over a period of time $T_p$ in a predefined sub-frequency range, which average energy has a certain predefined threshold value $\Omega$ which normally does not cause interference in other radio systems. For simplicity the threshold value $\Omega$ is assumed to be largely constant over the sub-frequency range. Two radio systems having non-overlapping radio propagation areas may operate in the same sub-frequency range, because their average energies over the period of time $T_p$ on the edge of the circle correspond to the threshold value $\Omega$ and thus do not affect each other. The radio systems 1 and 2 and the radio systems 2 and 3 cannot operate in the same sub-frequency range because their radio propagation areas 20 and 21; 21 and 22 respectively, are overlapping. But it is possible for the radio systems 3 and 4 or the radio systems 2 and 4 or the radio systems 1 and 4 to occupy the same sub-frequency range because there is no overlapping of the radio propagation areas 22 and 23 or of the radio propagation areas 21 and 23 or of the radio propagation areas 20 and 23.

Figure 3:
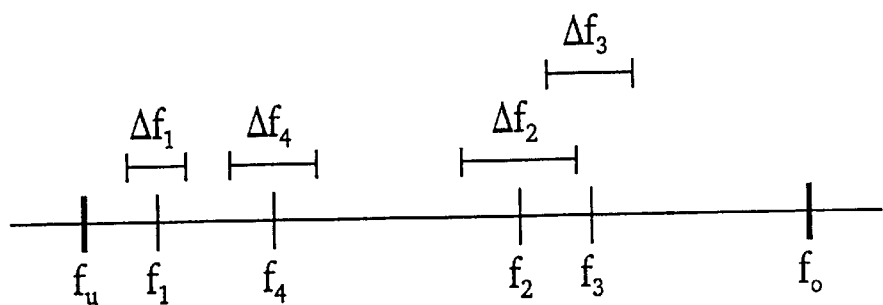
FIG. 3 shows a frequency range to be seized by the radio systems shown in FIG. 1.

In a predefined frequency range for signal transmission a radio system 1 to 4 thus occupies a sub-frequency range that depends on the radio propagation areas of the adjacent radio systems and may function according to various methods. FIG. 3 shows a frequency or spectral range with a lower frequency $f_u$ and an upper frequency $f_o$. For example, during a certain period of time $t_1+\Delta t_1$ the radio system 1 (radio propagation area 20) utilizes the first sub-frequency range from $f_1-\Delta f_1/2$ to $f_1+\Delta f_1/2$. The intermediate frequency of this first sub-frequency range is $f_1$ and its bandwidth is $\Delta f_1$. Signals are generally shifted from a baseband to a sub-frequency range as a result of an interconnection. During a period of time $t_2+\Delta t_2(t_1 \leq t_2 \leq t_1+\Delta t_2)$ the radio system 2 is to use a second sub-frequency range from $f_2-\Delta f_2/2$ to $f_2+\Delta f_2/2$ with the intermediate frequency $f_2$ and the bandwidth $\Delta f_2$, where $f_1+\Delta f_1/2 < f_2-\Delta f_2/2$ because the radio propagation areas 20 and 21 of the radio systems 1 and 2 are overlapping.

A radio system wishing to occupy a certain sub-frequency range during a predefined period of time is to check whether this sub-frequency range is free for a predefined radio propagation area. The size of the radio propagation area may then be predefined or lie between a minimum and maximum value $d_{min}$ and $d_{max}$. This check will be further explained with reference to FIG. 4.

Figure 4:
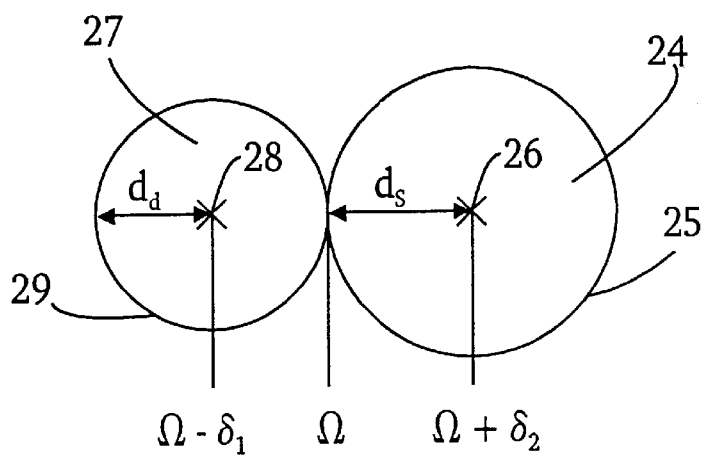
FIG. 4 shows a radio propagation area of an active radio system and a radio propagation area to be established of a radio system changing to the active mode.

FIG. 4 shows an active radio system 24 with a radio propagation area 25 which occupies a sub-frequency range from $f_{akt}-\Delta f_{akt}/2$ to $f_{akt}+\Delta f_{akt}/2$ having the intermediate frequency $f_{akt}$ and the bandwidth $\Delta f_{akt}$. The radio propagation area 25 having the radius $d_s$ will further be referred to as a protection area. On the periphery of the protection area 25 of the active radio system for the period of time $T_p$ the average energy $\Omega$ of the sub-frequency range $f_{akt}$ can be measured. Assuming that a substantially non-moving bafe radio station 26 lying in the center of the protection area of the radio system 24 provides the average energy $\Omega$ over the period of time $T_p$ on the periphery of the protection area, an average energy of $\Omega+\delta(d_s)$ of the sub-frequency range from $f_{akt}-\Delta f_{akt}/2$ to $f_{akt}+\Delta f_{akt}/2$ is available on the base radio station 26 for the period of time $T_p$. The value $\delta(d_s)$ which represents the attenuation of the average radiation energy of the base radio station 26, which attenuation depends on the radius $d_s$ for the period of time $T_p$, is determined by an estimate or determined empirically.

When the base radio station 26 radiates the average energy $\Omega+\delta(d_s)$ for the period of time $T_p$, the average energy $E_s(d)$ in the protection area for the period of time $T_p$ with increasing distance d to the base radio station 26 diminishes as follows:

$$E_s(d) = \Omega + \delta(d_s) - \delta(d),$$

If d is set equal to $d_s$, the average energy $E_s(d_s)$ on the periphery of the protection area for the period of time $T_p$ becomes equal to $\Omega$. As a rule, $\delta(d_s)$ or $\delta(d)$ respectively, can be computed according to the formula that is determined empirically or estimated. A simple formula reads as follows:

$$\delta(d) = \delta(d_o) - 10 \, n \, \log_{10}(d/d_o)$$

where $d_O$ is a reference radius and n is referenced a path loss exponent with $3.5 \leq n \leq 5$.

A radio system 27 with a base radio station 28 intends to change to the active mode i.e. exchange information signals with mobile or other base radio stations of the radio system. First the base radio station 28 is to check whether the provided sub-frequency range $f_{det} - \Delta f_{det}/2$ to $f_{det} + \Delta f_{det}/2$ in the radio propagation area 29 is free. The base radio station 28 may set, for example, the size of its radio propagation area 29 to be established, so that this size has a maximum value $d_{max}$. This radio propagation area 29 to be established will further be referred to as a detection area having radius $d_d$. It is then assumed that the base radio station 28 in essence does not move and lies in the center of the circular detection area. Assuming that for the period of time $T_p$ the average energy of signals from other radio systems (for example radio system 24) on the periphery of the detection area has an interfering effect on the base radio station 28 only when this average energy is greater than or equal to $\Omega$, the average interference energy at the base radio station 28 for the period of time $T_p$ is at least $\Omega - \delta(d_d)$, where $\delta(d_d)$ is the attenuation of the signals from other radio systems in the detection area. As a rule, $\delta(d_d)$ can be computed according to the formula that can be determined empirically or estimated and is shown above:

$$\delta(d) = \delta(d_O) - 10 \, n \, \log_{10}(d/d_O)$$

If the sub-frequency ranges of the radio systems 24 and 27 intersect ($f_{akt} + \Delta_{akt}/2 \geq f_{det-fdet}/2$ or $f_{akt-\Delta fakt}/2 \leq f_{det+\Delta fdet}/2$), the detection area 29 of the detecting radio system 27 and the protection area 25 of the existing radio system must not be overlapping. If the base radio station 28 in the detection area 29 detects an average interference energy over the period of time $T_p$, which energy exceeds $\Omega - \delta(d_d)$ in the frequency range $f_{det} - \Delta f_{det}/2$ to $f_{det} + \Delta f_{det}/2$, either the detection area is to be reduced by reducing $d_d$, or another sub-frequency range is to be selected. After the reduction of the detection area, another check is made whether the detection area 29 and the protection area 25 are still overlapping. If a minimum value $d_{min}$ for the size of the detection area 29 has been reached, and the detection area 29 and the protection area 25 are still overlapping, a further subfrequency range is to be selected. The largest possible detection area for a sub-frequency found perhaps after a plurality of attempts, which sub-frequency is not occupied by other radio systems, becomes the protection area for the relevant and activated radio system.

For the following explanation of the search for a further sub-frequency range there is presupposed that the detection area cannot be changed ($d_d$=constant). For example, the two radio systems 1 and 2 (compare FIGS. 1 and 2) are active and the radio system 3 would like to use a third sub-frequency range from $f_3 - \Delta f_3/2$ to $f_3 + \Delta f_3/2$ having the intermediate frequency $f_3$ and the bandwidth $\Delta f_3$ for a period of time $t_3 + \Delta t_3$, where $t_2 < t_3 < t_2 + \Delta t_2$. The third sub-frequency range having the intermediate frequency $f_3$ then intersects the second sub-frequency range having the intermediate frequency $f_2$ where, for example, $f_3 - \Delta f_3/2 < f_{2 + \Delta f_2}/2$ holds furthermore, the radio propagation area 21 (protection area) of the radio system 2 and the detection area 22 (predefined radio propagation area) of the radio system 3 are overlapping.

The base radio station 12 of the radio system 3 for the given detection area radius dd detects that the third sub-frequency range selected by it is used at least partly by a strange radio system (radio system 2 having the second sub-frequency range). Whether a sub-frequency range is occupied is detected by the base radio station 12 by a measurement of the average energy during the time period $T_p$ in the desired sub-frequency range. A subfrequency range is then considered free or unoccupied when the received average interference energy for the period of time $T_p$ is smaller than the threshold value $\Omega$ by the empirically determined or estimated value $\delta$ ($d_d$).

If a sub-frequency range is occupied, the base radio station of the radio system 3 checks in another sub-frequency range whether this sub-frequency range is occupied by a further radio system. For example, the base radio station 12 can measure whether the fourth sub-frequency range $f_4 - \Delta f_4/2$ to $f_4 + \Delta f_4/2$ lying between the first and the second sub-frequency range and having the intermediate frequency $f_4$ and the bandwidth $\Delta f_4$ is free.

It may happen that two base radio stations A and B of different radio systems simultaneously wish to access sub-frequency ranges for transmitting messages, which sub-frequency ranges are at least partly overlapping. The two base radio stations A and B have detected beforehand that their desired sub-frequency ranges in their detection areas having the radii $d_A$ and $d_B$ are not occupied. For avoiding collisions in such a case, a second phase or avoid-collision phase follows the above shown first phase or detection phase. In this second phase a base radio station transmits pulses during successive time slots which pulses are restricted to the desired sub-frequency range and adapted to the size of the detection area. The pulses are generally shifted from the baseband to the sub-frequency range as a result of interconnection and have spectral values in the desired sub-frequency range which spectral values have an average energy that exceeds the threshold value $\Omega$ by the value $\delta$ ($d_A$) or $\delta$ ($d_B$) respectively, so that during the time period $T_p$ the average energy on the periphery of the protection areas to be established having the radii $d_A$ or $d_B$ is equal to $\Omega$. The value $\delta(d_A)$ or $\delta$ ($d_B$) determines, as described above, the radio propagation area or protection area respectively, around the base radio station A or B, respectively. The time slot of two successive pulses must not fall short of a minimum value $t_{min}$ or exceed a maximum value $t_{max}$. At the same time, a base radio station transmitting pulses checks during the period of time in which it does not transmit pulses whether the measured average energy in the desired sub-frequency range in the period of time $T_p$ is smaller than the threshold value $\Omega$ by $\delta$ ($d_A$) or $\delta$ ($d_B$). The time period $T_p$ is then to exceed the maximum possible value $t_{max}$ between two successive pulses.

Figure 5:
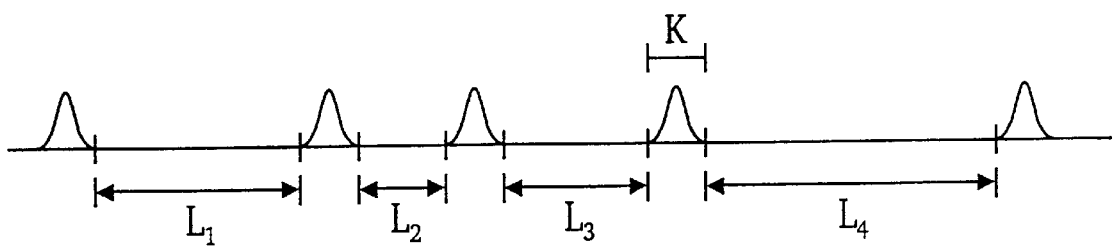
FIG. 5 shows a plurality of radio stations of a radio system during the check whether a sub-frequency range of the predefined frequency range is occupied.

As shown in FIG. 5, a pulse transmitted by a base radio station during the second phase has a predefined duration K. Two successive pulses have a time distance $L_i$, where i= . . . , -1, 0, 1, 2, 3, . . . while $$L_{i=P+n \, K}.$$

P is the average time distance between two successive pulses (reference value) and is defined by the following expression $$P = (t_{max} - t_{min})/2$$

n is an integer number (-N, . . . ,-1, 0, 1, . . . , N) determined in a random process. When the random number n is determined, there should be borne in mind that $t_{min}<L_i<t_{max}$ and thus $L_{min}=P-N\ k$ and $L_{max}=P+N\ k$. In FIG. 5 are shown five pulses radiated by a base radio station. Between the respective pulses lie the different time distances $L_1$, $L_2$, $L_3$, $L_4$ which are determined by a random process.

Based on the random time distances between two successive pulses determined by the random process, it is not very probable for two base radio stations to transmit pulses at the same time. The probability becomes ever smaller with the number of transmitted pulses. A base radio station is to transmit at least three successive pulses before it comes from the second phase to a third phase (normal phase) on condition that no other base radio station would like to occupy the desired sub-frequency range. Alternatively, it is possible that only two pulses are transmitted.

In the second phase a base radio station, after it has finished transmitting a pulse, begins detecting whether a base radio station of another radio system sends a signal in the desired frequency range. This detection process is repeated with the period $T_p$ irrespective of the transmission process while there is taken into account that a base radio station cannot and will not detect the average energy of its own transmitted pulse over the period of time $T_p$.

If a base radio station detects that a further base radio station would like to use the desired sub-frequency range for transmission and if the detection areas of the two radio systems are overlapping, the second phase is terminated and the first phase is returned to. A base radio station then checks after a pause chosen at random whether another sub-frequency range is free or at a later instant whether the sub-frequency range occupied thus far is free.

If no collision is detected, the detection area selected last becomes the protection area of the radio system i.e. $d_s=d_d$ and the third phase is changed to. In the third phase the base radio station of a radio system takes into account the selected sub-frequency range for the communication with the mobile station or base radio stations of the radio system. To avoid the occupation of the sub-frequency range or to avoid interference due to another radio system and to make the above-described detection by other radio systems possible, it is necessary for a base radio station which is in the third phase to show the base radio stations of the other radio systems that the sub-frequency range used by it is occupied. Thus the base radio station is to transmit signals whose average energy for the period of time $T_p$ lies in the respective sub-frequency range that exceeds the threshold value $\Omega$ by the empirical or estimated value $\delta(d_s)$, so that the average energy on the periphery of the protection area is equal to $\Omega$ for the period of time $T_p$. This may be realized in that pulses are transmitted in addition to the useful signals which useful signals are smaller than the value $\Omega+\delta(d_s)$ during the period of time $T_p$. The sum of the average energies of the useful signals and the pulses is $\Omega+\delta(d_s)$ during the time period $T_p$. For another radio system outside the protection area not to experience interference, there must be guaranteed that the average energy of the transmitted useful signals remains smaller than or equal to $\Omega+\delta(d)$ during the time period $T_p$.

The operations described in the communication environment with a plurality of radio systems are highly suitable for a substantially unchangeable environment or an environment that can be changed by fast moving objects (for example, private cars). In an environment that may be changed by objects, the base radio station is repeatedly to return from normal operation to the second phase and change the associated radio propagation area or protection area andlor the sub-frequency range as appropriate.

In a radio system with a base radio station it is alternatively possible that at least one mobile station carries out the measures of the base radio station described so far. A mobile station, provided it cannot detect its own whole radio propagation area, may revert to the assistance of one or various other mobile stations or to the base radio station.

Figure 6:
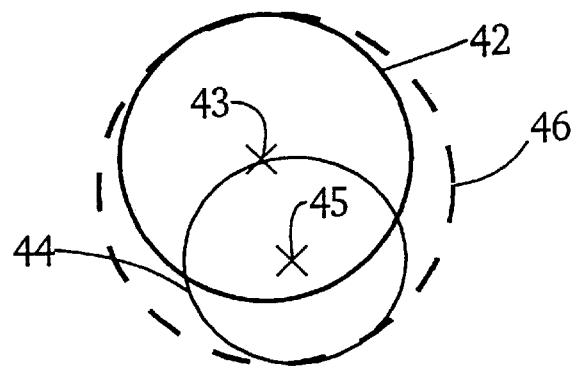
FIG. 6 shows a radio propagation area extended by a second radio station of a radio system.

It is also possible, as is shown in FIG. 6, to extend the protection area 42 of a base radio station 43 by the radio propagation area 44 of at least one associated mobile station 45. Basically, the mobile station 45 is to carry out the same steps for forming its protection area 44 which the associated base radio station 43 needs for forming its protection 25 area 42. However, there should be borne in mind that the mobile station 45 does not take into account for the detection the average energy radiated by the base radio station 43 during the period of time $T_p$. This is possible because the mobile station 45 and the base radio station 43 belong to the same radio system and may consequently exchange information signals according to a predefined protocol. The mobile station 45 thus receives information 30 about the transmission times of the base radio station 43 and may then carry out measurements while the base radio station 45 has pauses between its transmissions. The average energies on the periphery of the protection areas 42 and 44 of the base radio station 43 and of the mobile station 45 during the time period $T_p$ in effect result in an enlarged common protection area 46, because on the periphery of this enlarged protection area the sum of the average energies of the base radio station 43 and the mobile station 45 during the time period $T_p$ has dropped to the value $\Omega$.

The magnitude $\Omega$ is the uniform parameter determined for all the systems for the average energy of a pulse on the periphery of the detection area during the time period $T_p$ during the first and second phases or on the periphery of the protection area during the third phase, respectively.

All the radio systems are to know the uniform parameters $\Omega$, $T_p$, $t_{min}$ and $t_{max}$. All other parameters such as, for example, $\delta(d)$, $d_{min}$, $d_{max}$ may be determined specifically during the three phases in dependence on the system.

During normal operation of a radio system, the transmit power for the transmission of useful data of the stations is to be selected so that this leads to a radio propagation area that is smaller than the protection area. This certainly also avoids the interference by adjacent systems.

So far, there has been assumed for simplicity that a radio propagation area is circular. However, in reality this hardly ever occurs because a radio propagation area depends on local conditions such as, for example, the direction of the antenna of the base radio station or on obstacles. This, however, does not change any of the explanations of the protection area given above, provided that there is further assumed that the base radio stations belonging to one radio system may communicate in a smaller area than the protection area determined by the base radio station. This protection area determined by the base radio station may also be considered the theoretical protection area and the protection area reduced by local conditions may be considered the actual protection area. In the actual protection area, the average energy of the associated base radio station received from a radio station during the time period $T_p$ exceeds the threshold value $\Omega$ and is equal to $\Omega$ on the periphery. To guarantee that all the radio stations belonging to one radio system are always located in the actual protection area, the average energy measured by a radio station (mobile station or base radio station) during the time period $T_p$, which energy is transmitted by the base radic station, is to exceed $\Omega$. When the radio station is located in the actual protection area, it is allowed to communicate with other radio stations (other mobile stations andfor base radio station or other base radio stations of the same radio system). A measurement is only possible when the radio stations of one radio system utilize a common protocol so that the timings of the transmitted useful signals and pulses in that radio system are known.

The parameters $\delta(d)$ and $\Omega$ may also depend on frequency. In that case, a sub-frequency range is to be subdivided into M fundamental frequency units $df_i$. For each fundamental frequency unit $df_i$, may be defined a frequency-dependent magnitude $\Omega(df_i)$ and $\delta(d,df_i)$. The average energy during the time period $T_p$ of a sub-frequency range is the result of the sum of the magnitudes $\Omega(df_i)$ and $\delta(d,df_i)$ of all the M fundamental frequency units of this sub-frequency range.

Figure 7:
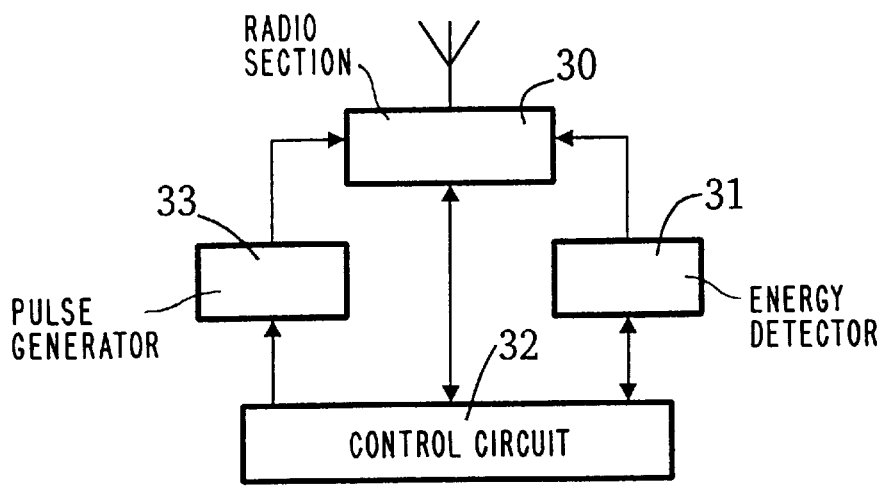
FIG. 7 shows a block circuit diagram of a radio station.

FIG. 7 shows a block circuit diagram of a radio station 5 to 18 comprising a radio section 30, an energy detector 31, a control circuit 32 and a pulse generator 33. The control circuit 32 which comprises, for example, a microprocessor, sets the radio section 30 to an intermediate frequency $f_i$ and a bandwidth $\Delta f_i$ (sub-frequency range) which radio section 30 is used for transmitting and receiving radio signals. As a result of interconnection, the radio section 30 shifts the pulses received from the pulse generator 33 and the useful data received from the control circuit 32 from the baseband to the sub-frequency range having the intermediate frequency $f_i$. Such a radio section 30, however, may also be arranged for being, fixedly set to an intermediate frequency. The control circuit 32 further additionally controls the pulse generator 33 and receives measuring results from the energy detector 31. The control circuit 32 is responsible for the magnitude of the average energy of the pulses or useful data to be transmitted, respectively during the time period $T_p$.

In the first phase the control circuit 32 sets the radio section 30 to a desired sub-frequency range. The radio section 30 supplies the received signals to the energy detector 31. The energy detector 31 measures for the radius $d_d$ of the detection area the average energy in the desired sub-frequency range in the time period $T_p$ and checks whether the measured average energy during the time period $T_p$, exceeds the threshold value $\Omega-\delta(d_d)$. If the threshold value is exceeded, the energy detector 31 sends a detection signal to the control circuit 32. The detection signal indicates that for this magnitude of the detection area the desired frequency range is occupied by at least one further radio station. The control circuit 32 then sets the radio section 30 to another average energy level (detection area diminishes) during the time period $T_p$, or to another intermediate frequency $f_i$ and bandwidth $\Delta f_i$. Subsequently, the energy detector once again checks whether the sub-frequency range for the selected detection area is free. Not until a free sub-frequency range for the specific detection area is found, will the second phase commence.

The control circuit 32 causes the pulse generator 33 to generate at certain instants a pulse having the duration K and an average power $(\Omega+\delta(d_d))/K$ for the respective radius $d_d$ of the detection are, which pulse is applied to the radio section to be transmitted. The control circuit 32 computes according to the above formula the time distance $L_i$ between two successive pulses. The control circuit 32 then computes a random number. All further necessary parameters (for example "P") are stored in a memory of the control circuit 32. After a pulse has been transmitted, the radio section 30 transfers the signals received in the desired frequency range to the energy detector 31 which determines the average energy for the period of time $T_p$. If the energy detector 31 detects that the measured average energy during the time period $T_p$ exceeds the threshold value $\Omega-\delta(d_d)$, a detection signal is applied to the control circuit 32 which then returns to the first phase. In that case, another radio station transmits signals in the desired frequency range. If, however, after for example three successive pulses have been transmitted, the control circuit 32 does not detect an occupation of the desired sub-frequency range, the third phase is changed to. The radius $d_s$ of the protection area is set equal to the latest radius $d_d$ of the detection area ($d_s=d_d$).

In the third phase, pulses are to be transmitted in addition to useful data, as described above, by the pulse generator 33 after it has been triggered by the control circuit 32, when the average energy of the useful data in the time period $T_p$ is smaller than $\Omega+\delta(d_s)$. As already extensively shown above, the sum of the average energies of useful data and additional pulses is $\Omega+\delta(d_s)$ during the time period $T_p$. The radio section 30 transmits pulses in the pulse-free period of time after they have been supplied by the control circuit 32 The useful signals may come from other units of the radio station or from external units. Alternatively, it is possible for the control circuit 32 to be controlled by a higher-order control circuit. In that case, the higher-order control circuit determines the start of the first phase and the end of the third phase.

Figure 8:
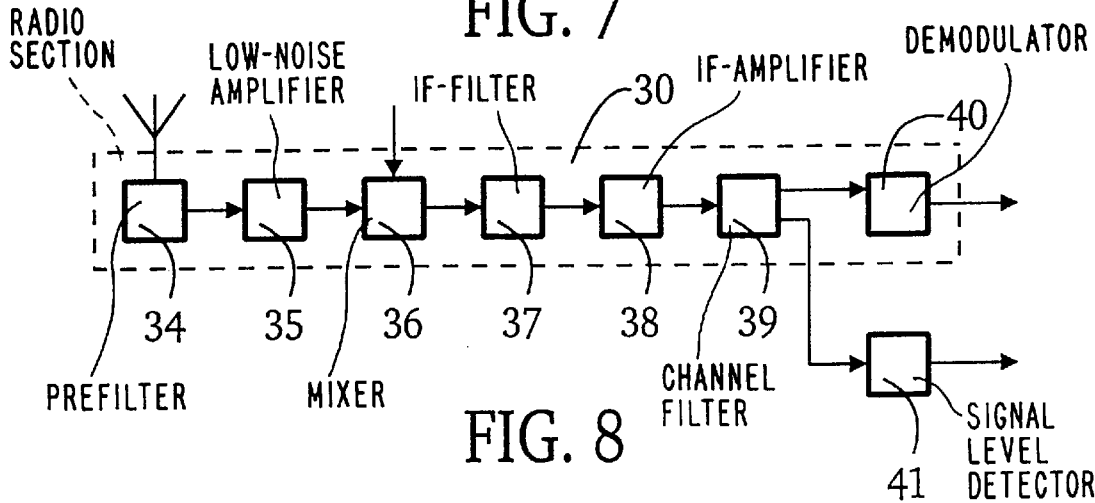
FIG. 8 shows a block circuit diagram of a radio section and energy detector shown in FIG. 7.

The radio section 30 and energy detector 31 shown in FIG. 7 will be further explained in the following with the aid of the block circuit diagram of FIG. 8. The radio section 30 comprises a prefilter 34 for filtering the signals received from the antenna, which prefilter supplies the filtered received signals via a low-noise amplifier 35, a mixer 36, an intermediate frequency filter 37 and an intermediate frequency amplifier 38 to a channel filter 39. In addition to the circuit elements 33 to 39, the radio section 30 includes a demodulator 40 which carries the demodulated useful data to further circuit elements not shown here. The energy detector 31 comprises a signal level detector 41 which detects the data produced by the channel filter 39 and applies the detected result to the control circuit 32.

What is claimed is:

1. A communication environment with a plurality of radio systems, a radio system of the plurality of radio systems comprising a radio station, the radio station comprising:

checking means for checking, prior to transmission of a useful signal, whether a certain sub-frequency range in a predefined frequency range is free for a selected size of a propagation area, transmitting means for transmitting at random instants, if the certain sub-range is free, at least two pulses restricted to the certain sub-frequency range, the radio station being configured to avoid collisions with another radio system belonging to the communication environment by detecting whether the other radio system has seized the certain sub-frequency range in an overlapping radio propagation area at the same time, the other radio system, for the purpose of collision avoidance, being configured to also transmit at random instants at least two pulses, and said transmitting means transmitting, if the certain sub-frequency range is free and no collision is detected, useful signals restricted to the certain sub-frequency range.

2. A communication environment as claimed in claim 1, wherein the radio station is configured to determine the size of the radio propagation area of the radio system at least by its radiated energy and is configured to detect a sub-frequency area as free when, on the one hand, the radiated energy outside its radio propagation area is so weak that an interference of another radio system does not occur and, on the other hand, the radio system does not experience interference caused by radiated energy of the other radio system.

3. A communication environment as claimed in claim 1, wherein the radio station after detecting that the certain sub-frequency range in the predefined frequency range for the selected size of the radio propagation area is occupied after a randomly determined time period is configured to carry out a new check either with a reduced size of the radio propagation area of the radio system or with another sub-frequency range.

4. A communication environment as claimed in claim 1, wherein the radio station is configured to transmit, if the sub-frequency range is free and no collision is detected, pulses in addition to the useful signals when average radiated energy during a predefined time period is smaller than an energy which determines the size of the radio propagation area.

5. A communication environment as claimed in claim 1, wherein the radio station is configured to store average energy on a periphery of the radio propagation area during a predefined time period, the predefined time period and a minimum and a maximum instant between two successive pulses.

6. A communication environment as claimed in claim 1, wherein the radio station is configured to determine via an estimated or empirically determined formula average energy to be radiated during a predefined period of time for a selected size of the radio propagation area.

7. A communication environment as claimed in claim 1, wherein the radio station is configured to determine via an estimated or empirically determined formula received average interference energy during a predefined period of time for a selected size of the radio propagation area.

8. A communication environment as claimed in claim 1, wherein the radio station is configured to carry out an energy detection and is configured to only communicate with other radio stations if the energy detection that the radio station is located in the radio propagation area.

9. A communication environment as claimed in claim 1, wherein the radio station comprises at least a radio unit for transmitting and receiving radio signals, an energy detector for measuring the average energy of the received radio signals during a predefined time period, a pulse generator for generating pulses transmitted via the radio unit and a control unit for controlling the radio unit and the pulse generator and for determining measuring results of the energy detector.

10. A radio station for use in a communication environment with a plurality of radio systems, the radio station comprising:

checking means for checking, prior to each transmission of a useful signal, whether a certain sub-frequency range in a predefined frequency range is free for a selected size of a propagation area, transmitting means for transmitting at random instants, if the certain sub-frequency range is free, at least two pulses restricted to the certain sub-frequency range, the radio station being configured to avoid collisions with another radio system belonging to the communication environment by detecting whether the other radio system has seized the certain sub-frequency range in an overlapping radio propagation area at the same time, the other radio system, for the purpose of collision avoidance, being configured to also transmit at random instants at least two pulses, and said transmitting means transmitting, if the certain sub-frequency range is free and no collision is detected, useful signals restricted to the certain sub-frequency range.

11. A method of seizing a sub-frequency range in a predefined frequency range the method comprising:

prior to each transmission of a useful signal, checking in a radio system belonging to a communication environment whether a certain sub-frequency range in a predefined frequency range is free for a selected size of a propagation area, if the certain sub-range is free, transmitting in the radio system at random instants at least two pulses restricted to the certain sub-frequency range and avoiding in the radio system of collisions with another radio system belonging to the communication environment by detecting whether the other radio system has seized the certain sub-frequency range in an overlapping radio propagation area at the same time, also transmitting in the other radio system, for the purpose of collision avoidance, at random instants at least two pulses, and if the certain sub-frequency range is free and no collision is detected, transmitting useful signals restricted to the certain sub-frequency range.

\* \* \* \* \*